United States Patent Office 3,269,991
Patented August 30, 1966

3,269,991
ETHYLENICALLY UNSATURATED SULFINES AND POLYMERS THEREOF
Edward M. La Combe, Charleston, W. Va., assignor to Union Carbide Corporation, a corporation of New York
No Drawing. Filed Nov. 29, 1963, Ser. No. 327,063
21 Claims. (Cl. 260—79.7)

This application is a continuation-in-part of copending application Serial No. 130,481, filed August 10, 1961, and issued March 1, 1966, as United States Patent No. 3,238,276, incorporated herein by reference.

The present invention is concerned with a novel and useful class of polymeric compositions, and is especially concerned with normally solid polymers, including homopolymers and interpolymers, of certain alpha-ethylenically unsaturated sulfines, i.e. sulfonium compounds possessing a terminal ethylenic unsaturation. The invention also contemplates the alpha-ethylenically unsaturated sulfine monomers herein disclosed as novel compositions of matter.

More particularly, the alpha-ethylenically unsaturated sulfines contemplated by this invention can be represented by the formula:

(I)

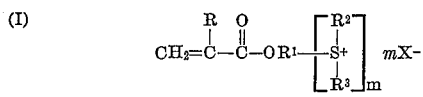

wherein R designates a hydrogen atom or a methyl radical; $R^1$ designates a saturated aliphatic hydrocarbon radical containing from 1 to about 4, and preferably from 2 to 3 carbon atoms, such radical more preferably being unsubstituted in the position adjacent to the oxygen atom to which it is directly connected; $R^2$ designates an alkyl radical containing from 1 to about 4, and preferably from 1 to 2 carbon atoms; $R^3$ designates a methyl or carboxymethyl (—$CH_2COOH$) radical; X designates a halogen atom, such as a bromine, iodine or chlorine atom, or a methyl sulfate (—$OSO_3CH_3$) radical, and specifically designates a chlorine atom when $R^3$ designates a carboxymethyl radical; and $m$ designates an integer of from 1 to 2. Moreover, in those instances when $m$ is 1, the sulfonium radical (II)

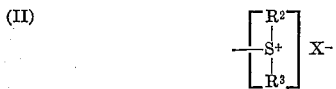

is preferably attached to that carbon atom of the radical designated by $R^1$ which is farthest from the adjacent oxygen atom, i.e. the carbon atom in the 1-position. When $m$ is 2, the sulfonium radicals are preferably attached to vicinal carbon atoms of the radical designated by $R^1$, and more preferably to those vicinal carbon atoms of the radical which are farthest from the adjacent oxygen atom, i.e. the carbon atoms in the 1,2-position. In addition, when $m$ is 2, $R^1$ more preferably contains at least 3 carbon atoms.

As illustrative of such alpha-ethylenically unsaturated sulfines, there can be mentioned acryloxymethyldimethylsulfonium methylsulfate,
(2-acryloxyethyl)dimethylsulfonium methylsulfate,
(2-acryloxyethyl)dimethylsulfonium bromide,
(2-acryloxyethyl)dimethylsulfonium iodide,
(2-acryloxyethyl)methylethylsulfonium methylsulfate,
(2-acryloxyethyl)methylbutylsulfonium methylsulfate,
(3-acryloxypropyl)dimethylsulfonium methylsulfate,
(4-acryloxybutyl)dimethylsulfonium methylsulfate,
(2-methacryloxyethyl)dimethylsulfonium methylsulfate,
(acryloxymethyl)carboxymethylmethylsulfonium chloride,
(2-acryloxyethyl)carboxymethylmethylsulfonium chloride,
(2-acryloxyethyl)carboxymethylethylsulfonium chloride,
(2-acryloxyethyl)carboxymethylbutylsulfonium chloride,
(3-acryloxypropyl)carboxymethylmethylsulfonium chloride,
(4-acryloxybutyl)carboxymethylmethylsulfonium chloride,
(2-methacryloxyethyl)carboxymethylmethylsulfonium chloride,
3-acryloxypropyl-1,2-bis(dimethylsulfonium) di(methylsulfate),
3-methacryloxypropyl-1,2-bis(dimethylsulfonium) di(methylsulfate),
4-acryloxybutyl-1,2-bis(dimethylsulfonium) di(methylsulfate),
4-methacryloxybutyl-1,2-bis(dimethylsulfonium) di(methylfulfate),
3-acryloxypropyl-1,2-bis(carboxymethylmethylsulfonium)dichloride,
4-methacryloxybutyl-1,2-bis(carboxymethylmethylsulfonium)dichloride, etc.

The preferred alpha-ethylenically unsaturated sulfines of this invention are the compounds represented by the formulae:

(III)

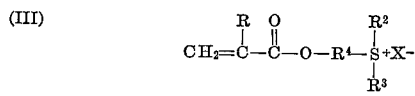

and (IV)

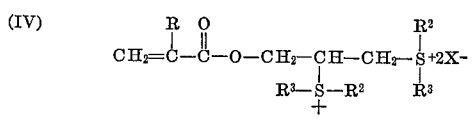

wherein R, $R^2$, $R^3$ and X are as defined above, and $R^4$ designates a saturated aliphatic hydrocarbon radical containing from 2 to 3 carbon atoms.

This invention is concerned, in one aspect, with normally solid homopolymers of the aforementioned alpha-ethylenically unsaturated sulfines.

The invention is also concerned with normally solid interpolymers containing, in polymerized form, on a theoretical monomer basis, at least about 10 mole percent, and preferably at least about 50 mol percent of an alpha-ethylenically unsaturated sulfine, as defined above, together with an alpha-ethylenically unsaturated thio-ether represented by the formula:

(V)

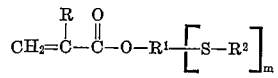

wherein R, $R^1$, $R^2$ and $m$ are as defined above. As illustrative of such alpha-ethylenically unsaturated thio-ethers, there can be mentioned:

methylthiomethyl acrylate
2-methylthioethyl acrylate,
2-ethylthioethyl acrylate,
2-butylthioethyl acrylate,
3-methylthiopropyl acrylate,
4-methylthiobutyl acrylate,
2-methylthioethyl methacrylate,
2,3-bis(methylthio)propyl acrylate,
2,3-bis(methylthio)propyl methacrylate,
3,4-bis(methylthio)butyl acrylate,
3,4-bis(methylthio)butyl methacrylate, etc.

The invention is concerned further with normally solid interpolymers containing, in polymerized form and on a theoretical monomer basis, at least about 1 mole percent, preferably from about 5 to about 95 mole percent, and more preferably from about 50 to about 95 mole percent of an alphaethylenically unsaturated sulfine, as defined above, together with an alpha-ethylenically unsaturated comonomer selected from the group consisting of (a) acrylonitrile and methacrylonitrile; (b) the vinyl alkanoates represented by the formula:

(VI)
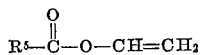

wherein $R^5$ designates an alkyl radical preferably containing from 1 to about 7 carbon atoms and more preferably from 1 to 3 carbon atoms, such as vinyl acetate, vinyl propionate, vinyl butyrate, vinyl hexanoate, vinyl 2-ethylhexanoate, vinyl octanoate, etc., and (c) the alkyl and cyanoalkyl acrylates and methacrylates represented by the formula:

(VII)
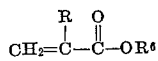

wherein R is defined above and $R^6$ designates an alkyl or cyanoalkyl radical preferably containing from 1 to about 8 carbon atoms, and more preferably from 1 to 4 carbon atoms, such as methyl acrylate, methyl methacrylate, ethyl acrylate, ethyl methacrylate, 2-cyanoethyl acrylate, 2-cyanoethyl methacrylate, butyl acrylate, 4-cyanobutyl acrylate, hexyl acrylate, 2-ethylhexyl acrylate, octyl acrylate, octyl methacrylate, etc., and the like.

Thus, it is to be noted that the polymers of this invention, include both alpha-ethylenically unsaturated sulfine homopolymers, as well as copolymers thereof with an alpha-ethylenically unsaturated thio-ether, or with an alpha-ethylenically unsaturated commoner as defined above. In addition, the polymers of this invention include terpolymers of an alpha-ethylenically unsaturated sulfine with both an alpha-ethylenically unsaturated thio-ether and with an alpha-ethylenically unsaturated comonomer as defined above. Such terpolymers contain, in polymerized form and on a theoretical monomer basis, (a) at least about 10 mole percent and preferably at least about 50 mole percent of the alpha-ethylenically unsaturated sulfine, when taken together with the amount of polymerized alpha-ethylenically unsaturated thio-ether present, and (b) at least about 1 mole percent, preferably from about 5 to about 95 mole percent, and more preferably from about 50 to about 95 mole percent of the alpha-ethylenically unsaturated sulfine, based upon the total amount of polymerized monomers present. It is also to be noted that the polymerized alpha-ethylenically unsaturated sulfine component of the polymers of this invention can be composed of a mixture of sulfines, such that more than one type of sulfonium radical is present. Similarly, more than one type of comonomer can also be present including those specifically described above, as well as a minor amount of other copolymerizable monomers.

The polymers of this invention can be produced by several different techniques. For instance, the alpha-ethylenically unsaturated sulfine can be obtained initially in monomeric form and subsequently polymerized by conventional processes for the polymerization of alpha-ethylenically unsaturated compounds either alone, so as to produce homopolymers thereof, or together with one or more comonomers, so as to produce copolymers or terpolymers thereof, etc. When desired initially in monomeric form, the alpha-ethylenically unsaturated sulfine can readily be obtained by reacting an alpha-ethylenically unsaturated thio-ether with an alkylating agent in accordance with the equation:

(VIII)
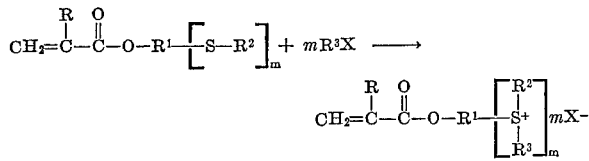

wherein R, $R^1$, $R^2$, $R^3$, X and $m$ are as defined above. Reactions between a thio-ether and an alkylating agent are in general discussed, for instance, in "Organic Chemistry," vol. 1, 2nd ed., by H. Gilman, John Wiley & Sons, N.Y. (1948), page 867, such teachings being incorporated herein by reference. Concordant therewith, by way of illustration, the alkylation can be carried out by bringing the thio-ether and the alkylating agent into reactive admixture, in a suitable solvent or diluent, if desired, at a temperature of from about 25° C. or slightly lower, up to about 90° C. to 100° C., or slightly higher. In addition, a small amount of a conventional polymerization inhibitor, such as hydroquinone, or the like, is preferably incorporated in the reaction mixture. As typical of the alkylating agents which can be employed in this regard there can be mentioned dimethyl sulfate, methyl halides such as methyl bromide, methyl chloride and methyl iodide, chloroacetic acid, etc. Moreover, the reaction is preferably carried out in a diluent which is a solvent for the thio-ether but a non-solvent for the resulting sulfine product, such as benzene, isopropyl ether, etc. Upon completion of the reaction, the sulfine product can be separated and recovered in any convenient manner.

The polymers of this invention can thereafter be obtained by conventional polymerization processes. Thus, for instance, solution polymerization techniques can be utilized wherein an inert organic solvent solution of the alpha-ethylenically unsaturated sulfine alone, or in admixture with one or more comonomers in proportions as hereinabove described in connection with the polymer composition, is contacted with a catalytic amount of a polymerization catalyst and maintained at a temperature at which polymerization will occur for a period of time sufficient to produce a polymer product. A particularly useful solvent which can be utilized in this connection is acetonitrile, although any other suitable inert organic solvent, such as acetone, N,N-dimethylformamide, dimethylsulfone, N,N-dimethylacetamide, ethylene carbonate, ethylene carbamate,- gamma-butyrolactone, N-methyl-2-pyrrolidone, etc., can also be employed. Alternatively, bulk, suspension or emulsion polymerization techniques can also be used under otherwise similar reaction conditions, i.e., proportions, temperature, time, etc. Similarly, other diluents such as water, benzene, toluene, xylene, hexane, heptane, etc., can also be used.

The catalysts most frequently employed in the polymerization reactions, and especially in connection with solution polymerization techniques, are the free-radical-type polymerization catalysts, such as the azo compounds, of which azo-2,2'-diisobutyronitrile, dimethyl azo-2,2'-diisobutyrate, azo-2,2' - bis(2,4 - dimethylvaleronitrile), azo-2,2'-diisobutyramide, and the like, are typical. Other free-radical-type polymerization catalysts which can be employed are the peroxides, such as hydrogen peroxide, acetyl peroxide, benzoyl peroxide, peracetic acid, potassium persulfate, calcium percarbonate, etc. The catalyst is ordinarily incorporated in the polymerization reaction mixture in a concentration of from about 0.01 percent to about 5 percent or more by weight, and preferably from about 0.2 to about 2 percent by weight, based upon the total weight of monomer present, although any catalytic amount thereof can be utilized.

The polymerization is generally effected by bringing the monomers into contact with the catalyst at a temperature of from about —10° C., or slightly lower, to about 120° C., or slightly higher, accompanied by heating or cooling as needed to maintain the temperature at the desired level. The polymerization time will depend upon a variety of factors, such as the nature of the monomer(s), catalyst and/or diluent employed, the reaction temperature, etc., and can vary over a wide range. For instance, a suitable reaction period lies in the range of from about 1 to about 200 hours, but is not necessarily limited thereto. In addition, the polymerization can be carried out under atmospheric, superatmospheric or subatmospheric pressures, as desired.

Under completion of the polymerization reaction, the polymer product can be recovered in any convenient manner, such as by coagulation, filtration, centrifugation, etc. The reaction product can also be employed directly in many uses for the polymer product, obviating the recovery of the polymer per se.

In an alternative manner to the polymerization technique described above, the alkylation of the alpha-ethylenically unsaturated thio-ether and the polymerization of the monomer(s) can be carried out in one operation by incorporating the alkylating agent in a polymerization reaction mixture containing, as the polymerizable monomer(s), the alpha-ethylenically unsaturated thio-ether alone, or in admixture with an alpha-ethylenically unsaturated comonomer as defined above. In such a procedure, it is to be noted, the reactants should be employed in a mole ratio of at least about 0.1 mole and preferably at least about 0.5 mole up to about 5 or more of the alkylating agent per thio-ether radical $[S—R^2]$ of the alpha-ethylenically unsaturated thio-ether. Moreover, when a comonomer is present, the alpha-ethylenically unsaturated thio-ether should be employed in an amount sufficient to provide upon alkylation and polymerization, on a theoretical monomer basis, at least about 1 mole percent, preferably from about 5 to about 95 mole percent, and more preferably from about 50 to about 95 mole percent of a polymerized alpha-ethylenically unsaturated sulfine, based upon the total amount of polymerized monomers present in the resulting polymer. Such amount is readily determinable by one skilled in the art in light of this disclosure. The polymerization reaction and the recovery of the resulting polymer, when desired, is carried out as otherwise described above.

The polymers of this invention can also be prepared by reacting the alkylating agent with an initially formed polymer, i.e. either a homopolymer of an alpha-ethylenically unsaturated thio-ether, or a copolymer thereof with an alpha-ethylenically unsaturated comonomer as defined above, the alkylation and initial polymerization, as well as the recovery of the polymer product, also being carried out as otherwise described above.

The novel alpha-ethylenically unsaturated sulfines of this invention find utility in various applications. They can, for instance, be used as chemical intermediates, and, like other known sulfines, can be employed as assistants for textile processing and printing, and as foaming, emulsifying and wetting agents. They can, of course, also be employed to produce the novel polymers of this invention.

The polymers of this invention, in turn, also find utility in a wide variety of applications. They can, for example, be used to produce films suitable for use as packaging and coatings. In addition, the water soluble polymers, generally those containing, in polymerized form and on a theoretical monomer basis, at least about 50 mole percent of the alpha-ethylenically unsaturated sulfine, can be employed as flocculents for aqueous anionic suspensions, i.e. aqueous suspensions which are stabilized by a negative charge, such as sewage, white water, silica or clay suspensions, etc. In particular, it has been found that fiber-forming polymer compositions evidencing enhanced dye affinity can be produced by blending conventional fiber-forming acrylonitrile polymers with minor amounts, i.e. from about 1 perent to about 30 percent by total weight, and preferably from about 5 percent to about 20 percent by total weight, of the novel polymers of this invention.

The fiber-forming acrylonitrile polymers include normally solid homopolymers of acrylonitrile, as well as copolymers and terpolymers thereof with other alpha-ethylenically unsaturated comonomers, such copolymers and terpolymers containing the polymerized acrylonitrile component in a concentration of at least about 35 percent by weight based upon the total weight of the polymer. Illustrative in this connection of other alpha-ethylenically unsaturated comonomers which can be polymerized with acrylonitrile to produce conventional fiber-forming polymers there can be mentioned vinyl chloride, vinylidene chloride, styrene, vinyl acetate, acrylamide, methyl acrylate, etc. The contemplated acrylonitrile polymers, it is to be noted, are those which are useful in the production of fibers designated as acrylic and modacrylic fibers in accordance with the Federal Trade Commission Rules and Regulations under the Textile Identification Act, enacted September 2, 1958, and can be obtained in well known manner, such for example, as by the processes disclosed in U.S. Patents 2,420,565, 2,603,620 and 2,868,756, or by any other convenient means known to the art.

The improved dyeable, fiber-forming compositions can be prepared by blending the normally solid polymers, i.e., both the fiber-forming acrylonitrile polymers and the polymers of this invention, in proportions as hereinabove described, in conventional mixing equipment, such as dough mixers, roll mixers, Banbury mixers, or the like, or by fluxing the solid polymers. The most effective method of mixing, however, involves treatment in the solution state, wherein the polymers are initially dissolved together in a suitable inert organic solvent, such as those described above in connection with polymerization reactions. The solution of the blended polymer compositions can then be spun into fibers by the conventional wet or dry spinning techniques known to the art. It is to be noted that during the blending or spinning operaitons, other additives such as delusterants, heat and light stabilizers, etc., can also be added to the fiber-forming compositions, if desired.

After both stretching the fibers to orient the molecules and develop the desired tensile properties, and shrinking the fibers to improve their thermal properties, the modified fibers produced as described above can be employed in the many applications in which synthetic fibers are generally employed. Moreover, the modified fibers are readily dyed by conventional dyeing techniques with a wide variety of dyestuffs to produce highly colored fibers of desirable properties. Such fibers are dyed to deeper shades and absorb more dye from the dye bath than do the fibers prepared from the corresponding unmodified acrylonitrile polymers of which they are in part composed.

The present invention can be illustrated further by the following specific examples of its practice, but it is not intended to be limited thereby. In the examples, the molecular weight of the normally solid polymers (i.e. solid at room temperature under atmospheric pressure) was determined by measuring their reduced viscosity, which, particularly prior to alkylation, may vary from about 0.1 to about 5, or even higher, and most frequently from about 1 to about 3, when measured at a temperature of 30° C. from a solution containing 0.2 gram of the polymer in 100 milliliters of N,N-dimethylformamide.

The term "reduced viscosity" is well known in the art, and designates a value obtained by dividing the specific viscosity of a solution of the polymer by the concentration of the polymer in the solution, the concentration being measured in grams of polymer per 100 milliliters of solvent. The specific viscosity is obtained by dividing the difference between the viscosity of the polymer solution and the viscosity of the pure solvent by the viscosity of the solvent. In particular, the reduced viscosities set forth in the examples were calculated from the equation:

$$I_R = \frac{\frac{N}{N_0}}{C}$$

wherein N is the difference between the flow-time of the polymer solution and the flow-time of the solvent, $N_0$ is the flow-time of the solvent, and C is the concentration of the polymer in solution expressed in grams per 100 milliliters of solution. The reduced viscosity of a polymer is regarded as a measure of the molecular weight of the polymer, i.e., the degree of polymerization, with higher values indicating higher molecular weights.

Two methods were employed in quantitatively measuring the dye absorption values set forth in the example, viz.:

PROCEDURE A

In this procedure, a 0.1 gram sample of the dyed fabric is scoured with isopropanol to remove absorbed dyestuff and dissolved in 100 milliliters of N,N-dimethylformamide. The transmission of this solution at 590 millimicrons is measured using a Bausch and Lomb Spectronic 20 spectrophotometer. The amount of dyestuff in this solution, which is equal to the amount of dyestuff absorbed by the 0.1 gram sample of fabric, is read directly from the curve of transmission versus concentration of the dyestuff in N,N-dimethylformamide. By simple proportion, the amount of dyestuff absorbed by the total weight of fabric is calculated. Then the percent dye absorbed is calculated by the equation:

$$\frac{\text{Amount of dye absorbed}}{\text{Amount of dye available}} \times 100 = \text{percent of total available}$$

dye absorbed by the fabric. The percent increase in dye absorption due to the inclusion of the polymers of this invention is calculated as follows:

$$\left[\frac{\text{Percent total dye absorbed by sample}}{\text{Percent total dye absorbed by control}} - 1\right] \times 100$$

PROCEDURE B

In this procedure, a 0.2 gram sample of the dyed and scoured fabric is dissolved in 50 milliliters of N,N-dimethylformamide containing 0.25 milliliter of acetic acid. The transmission of this solution at 525 millimicrons is measured using a Beckman Model B spectrophotometer. The amount of dyestuff absorbed by the 0.2 gram sample of fabric, is read directly from the curve of transmission versus concentration of the dyestuff in N,N-dimethylformamide. By simple proportion, the amount of dyestuff absorbed by the total weight of fabric is calculated. Then the percent dye absorbed by the fabric and the percent increase in dye absorption due to the inclusion of the polymers of this invention is calculated as described above in Procedure A.

*Example I*

To a 300 milliliter Pyrex pressure bottle there were charged 73 grams of 2-methylthioethyl acrylate, 47 grams of chloroacetic acid, 50 grams of acetonitrile and 0.06 gram of hydroquinone. The bottle was purged with nitrogen, capped and tumbled in a constant temperature rotary water bath maintained at a temperature of 75° C., wherein the bottle was allowed to remain over a weekend. The contents of the bottle were then poured into 1200 milliliters of isopropyl ether with continued stirring. In this manner, approximately 43 grams of (2-acryloxyethyl) carboxymethylmethylsulfonium chloride settled out, and was recovered as a liquid. Upon polymerization of the product by conventional free-radical polymerization techniques as described above, solid poly[(2-acryloxyethyl) carboxymethylmethylsulfonium chloride] is obtained.

In like manner, 3-methacryloxypropyl-1,2-bis(carboxymethylmethylsulfonium)dichloride is obtained by the reaction of 2,3-bis(methylthio)propyl methacrylate with chloroacetic acid, and from which poly[3-methacryloxypropyl - 1,2 - bis(carboxymethylmethylsulfonium)dichloride] is produced by conventional free radical polymerization techniques as described above.

*Example II*

To a 300 milliliter Pyrex pressure bottle, there were charged 73 grams of 2-methylthioethyl acrylate, 63 grams of dimethyl sulfate, 100 grams of benzene and 0.05 gram of hydroquinone. The bottle was purged with nitrogen, capped and tumbled in a constant temperature rotary water bath, maintained at a temperature of 50° C. for a period of about 23 hours. In this manner, (2-acryloxyethyl)dimethylsulfonium methylsulfate settled out, and was recovered as a liquid in an essentially quantitative yield. Upon polymerization of the product by conventional free-radical polymerization techniques as described above, solid poly[2 - acryloxyethyl)dimethylsulfonium methylsulfate] is obtained.

In similar manner, (2-methacryloxyethyl)dimethylsulfonium methylsulfate was recovered as a liquid in an essentially quantitative yield by the reaction of 80 grams of 2-methylthioethyl methacrylate with 63 grams of dimethyl sulfate as otherwise described above in this example. Upon polymerization of the product by conventional free-radical polymerization techniques as described above, solid poly[(2 - methacryloxyethyl)dimethylsulfonium methylsulfate] is obtained.

In like manner, 3-acryloxypropyl-1,2-bis(dimethylsulfonium) di(methylsulfate) is obtained by the reaction of 2,3-bis(methylthio)propyl acrylate with dimethyl sulfate, and from which poly[3-acryloxypropyl-1,2-bis(dimethylsulfonium) di(methylsulfate)] is produced by conventional free-radical polymerization techniques as described above.

*Example III*

To a 300 milliliter Pyrex pressure bottle, there were charged 18 grams of a methyl acrylate/2-methylthioethyl methacrylate copolymer, 6 grams of dimethylsulfate and 100 grams of acetonitrile. The copolymer employed was comprised of approximately 76 percent by weight of polymerized methyl acrylate and 24 percent by weight of polymerized 2-methylthioethyl methacrylate, and had a reduced viscosity of 1.57. The amount of dimethyl sulfate employed was sufficient to convert essentially all of the polymerized 2-methylthioethyl methacrylate to the corresponding polymerized form of (2-methacryloxyethyl)dimethylsulfonium methylsulfate. The bottle was purged with nitrogen, capped and tumbled in a constant temperature rotary water bath, maintained at a temperature of 50° C. for a period of 20 hours. The resulting polymer solution was hazy, and was cleared by the addition of 50 milliliters of methanol. The polymer product was then coagulated in 1500 milliliters of isopropyl ether and thereafter decanted and washed in an additional 1000 milliliters of isopropyl ether. Finally, the polymer product was dried at a temperature of 50° C. in an air circulating oven for a period of 90 hours. In this manner, there were obtained 22.3 grams of a copolymer comprised of approximately 61 percent by weight of polymerized methyl acrylate and 39 percent by weight of polymerized (2-methacryloxyethyl)dimethylsulfonium methyl sulfate, i.e. approximately 85 mole percent of methyl acrylate and 15 mole percent of (2-methacryloxyethyl)dimethylsulfonium methylsulfate in polymerized form, on a theoretical monomer basis. The copolymer product was found to contain 8.7 percent by weight of sulfur. Infra-red analysis confirmed the presence of the sulfate ion.

The copolymer product of this example was subsequently employed to improve the dye affinity of fibers produced from a conventional, fiber-forming acrylonitrile polymer in the following manner. Twenty grams of the copolymer were dissolved in 1145 grams of acetonitrile. To this solution there were then added 380 grams of a fiber-forming terpolymer comprised of approximately 70 percent by weight of polymerized acrylonitrile, 20 percent by weight of polymerized vinyl chloride, and 10 percent by weight of vinylidene chloride, (prepared as described in U.S. 2,868,756), and 16 grams of a 50/50 by weight mixture of dioctyltin maleate and 2(2-ethylhexyloxy) - 5 - ethyl - 2 - oxo - 4 - propyl - 1,3,2 - dioxaphosphorinane heat and light stabilizers, to form a slurry. The temperature of the slurry was raised to about 70° C., accompanied by continued agitation, so as to effect solvation, thereby forming a homogeneous solution. The solution was then filtered under pressure and metered through a spinnerette having 80 holes, each 0.13 millimeter in diameter. The multifilament yarn thus produced from the blend of the conventional fiber-forming acrylonitrile polymer and the copolymer product of this example, containing approximately 5 percent by weight of the copolymer based upon the total weight of the polymer blend, was thereafter coagulated in an aqueous bath containing 15 percent acetonitrile, withdrawn from the bath, washed with a dilute aqueous solution of hydroxyethylated poly(vinyl alcohol), stretched 300 percent at a temperature of about 60° C., and finally dried and annealed at temperatures up to about 150° C. (yarn I). A control yarn (yarn II) was spun in a similar manner for comparison purposes from the same conventional, fiber-forming acrylonitrile terpolymer, containing the same heat and light stabilizers, but omitting the use of the copolymer of this example.

Samples of knit fabrics prepared from each of the above yarns were dyed with an acid dyestuff, Xylene Milling Blue GL (Color Index 50, 315), by the well known cuprous-ion technique wherein cupric ions introduced into the dye bath as cupric sulfate are reduced to the cuprous state with any suitable reducing agent, such as hydroxyl-ammonium sulfate, zinc formaldehyde sulfoxylate, glyoxal, etc., to enhance the dyeability of acrylonitrile containing yarns. The dye bath was prepared as follows, with all material based on the weight of the fabric:

| | Percent |
|---|---|
| Xylene Milling Blue GL | 4 |
| Cupric sulfate | 2 |
| Hydroxylammonium sulfate | 1 |
| Methyl polyethanol quaternary amine surfactant | 1 |

Samples of knit fabrics prepared from each of the yarns were dyed in separate boiling dye baths using a dye bath liquor to fabric ratio of 30 milliliters per gram. After about 2 hours at the boil, during which time a constant dye bath volume was maintained, the fabrics were removed from the dye baths, scoured, rinsed and dried. The knitted fabric prepared from the blended polymer composition of this example (yarn I) was dyed a deep blue shade, and dye absorption values determined by Procedure A, above, after completion of the dyeing indicated that 66 percent of the dye available in the dye bath had been absorbed by the fabric. The control fabric (yarn II), however, was dyed a lighter blue shade, and dye absorption values determined in similar manner indicated that only 45 percent of the available dye had been absorbed by the fabric. Thus, the dye absorption of the fibers produced from the polymer blend of this example was 46 percent greater than that of the fibers produced from the control, unmodified acrylonitrile terpolymer.

In similar manner, dye affinity is improved by blending the acrylonitrile terpolymer with a methyl methacrylate/(2 - acryloxyethyl)dimethylsulfonium methylsulfate copolymer, an ethyl acrylate/(2-acryloxyethyl)dimethylsulfonium methylsulfate copolymer, a cyanoethyl acrylate/(2 - acryloxyethyl)dimethylsulfonium methylsulfate copolymer and a vinyl acetate/(2-acryloxyethyl)dimethylsulfonium methylsulfate copolymer in accordance with this invention.

*Example IV*

In a manner similar to that described in Example III, 5.6 grams of chloroacetic acid were reacted in 150 grams of acetonitrile with 20 grams of a methylacrylate/2-methylthioethyl methacrylate copolymer at a temperature of 50° C. for a period of 20 hours. The copolymer employed was comprised of approximately 78 percent by weight of polymerized methyl acrylate and 22 percent by weight of polymerized 2-methylthioethyl methacrylate, and had a reduced viscosity of 1.64. The resulting polymer product was coagulated in and washed with isopropyl ether, and subsequently dried at a temperature of 50° C. in an air-circulating oven. There were thus obtained 23.3 grams of a terpolymer comprised of approximately 72 percent by weight of polymerized methyl acrylate, 25 percent by weight of polymerized (2-methacryloxyethyl)carboxymethylmethylsulfonium chloride and 3 percent by weight of polymerized 2-methylthioethyl methacrylate, i.e. approximately 88 mole percent of methyl acrylate, 10 mole percent of (2-methacryloxyethyl)carboxymethylmethylsulfonium chloride and 2 mole percent of 2-methylthioethyl methacrylate in polymerized form, on a theoretical monomer basis. The terpolymer product had a reduced viscosity of 1.71, and was found to contain 4.24 percent by weight of sulfur and 3.4 percent by weight of chlorine.

The terpolymer product of this example was subsequently employed to improve the dye affinity of fibers produced from a conventional, fiber-forming acrylonitrile polymer, and evaluated as such, in the manner described above in Example III, i.e substituting the terpolymer product of this example for the coplymer product of Example III under otherwise identical conditions. A sample of knit fabric thus prepared from the blended polymer composition of this example was dyed a deep blue shade, and dye absorption values indicated that 79 percent of the available dye had been absorbed by the fabric. The control fabric, however, was dyed a lighter blue shade, and dye absorption values indicated that only 43 percent of the available dye had been absorbed by the fabric. Hence, the dye absorption of the fibers produced from the polymer blend of this example was 84 percent greater than that of the fibers produced from the control, unmodified acrylonitrile polymer.

When a dye bath containing 3 percent Sevron Brilliant Red 4G (a cationic dyestuff) and 1 percent of a tetradecyl sodiumsulfonate surfactant based upon the weight of fabric was substituted for the Xylene Milling Blue BL dye bath employed above in this example, a sample of knit fabric prepared from the blended polymer composition of this example was dyed a medium red shade, and dye absorption values determined by Procedure B, above, indicated that 41 percent of the available dye had been absorbed by the fabric. On the other hand, the control fabric was dyed a light red shade, and dye absorption values indicated that only 8 percent of the available dye had been absorbed by the fabric. In this case, the dye absorption of the fibers produced from the polymer blend of the example was 413 percent greater than that of the fibers produced from the control, unmodified acrylonitrile polymer.

In similar manner, dye affinity is improved by blending the acrylonitrile polymer with poly[(2-acryloxyethyl)carboxymethylmethylsulfonium chloride] in accordance with this invention.

*Example V*

In a manner similar to that described in Example III, 4.6 grams of dimethyl sulfate were reacted in 150 grams of acetonitrile with 18.5 grams of a methyl acrylate/2,3-bis(methylthio)propyl methacrylate copolymer at a temperature of 50° C. for a period of 22 hours. The copolymer employed was comprised of approximately 78 percent by weight of polymerized methyl acrylate and 22 percent by weight of polymerized 2,3-bis(methylthio)propyl methacrylate, and had a reduced viscosity of 1.66. The amount of dimethyl sulfate employed was sufficient to convert essentially all of the polymerized 2,3-bis(methyl thio)propyl methacrylate to the corresponding polymerized form of 3-methacryloxypropyl-1,2-bis(dimethylsulfonium) di(methylsulfate). The resulting polymer product was coagulated in and washed with isopropyl ether, and subsequently dried at a temperature of 50° C. in an air-circulating oven. There were thus obtained 24.9 grams of a copolymer comprised of approximately 68 percent by weight of polymerized methyl acrylate and 32 percent by weight of polymerized 3-methacryloxypropyl-1,2-bis(dimethylsulfonium) di(methylsulfate), i.e. approximately 90 mole percent of methyl acrylate and 10 mole percent of 3-methacryloxypropyl-1,2-bis(dimethylsulfonium) di(methylsulfate) in polymerized form, on a theoretical monomer basis. The copolymer product had a reduced viscosity of 2.6, and was found to contain 8.59 percent by weight of sulfur.

When blended with a conventional, fiber-forming acrylonitrile polymer as described above in Example III, the copolymer product of this example substantially improves the dye affinity of fibers produced therefrom. In similar manner, dye affinity is improved by blending the acrylonitrile polymer with poly[3-methacryloxypropyl-1,2-bis(carboxymethylmeythlsulfonium) dichloride] in accordance with this invention.

*Example VI*

In a manner similar to that described in Example I, 2.52 grams of dimethyl sulfate were reacted in 20 grams of acetone with 2.92 grams of poly(2-methylthioethyl acrylate) having a reduced viscosity of 1.9, at a temperature of 50° C., for a period of 17 hours. The amount of dimethyl sulfate employed was sufficient to convert essentially all of the polymerized 2-methylthioethyl acrylate to the corresponding polymerized form of (2-acryloxyethyl)dimethylsulfonium methyl sulfate. The resulting polymer product was insoluble in the acetone and deposited as an opaque film on the walls of the pressure bottle. The acetone was then decanted and the polymer product was readily dissolved in 30 milliliters of water. About one third of the aqueous solution was used to cast a film of the polymer on a glass plate, such a film being useful, for example, as packaging material. The remainder of the polymer in solution was coagulated in and washed with acetone, and subsequently dried at a temperature of 50° C. in an air-circulating oven. There were thus obtained 3.9 grams of poly[(2-acryloxyethyl)dimethylsulfonium methylsulfate].

When blended with a conventional fiber-forming acrylonitrile polymer as described above in Example III, the polymer product of this example substantially improves the dye affinity of fibers produced therefrom. In similar manner, dye affinity is improved by blending the acrylonitrile polymer with poly[(2-acryloxyethyl)methylethylsulfonium methylsulfate] in accordance with this invention.

*Example VII*

In a manner similar to that described in Example I, 26 grams of chloroacetic acid were treated in 150 grams of acetonitrile and 25 grams of acetone with 20 grams of poly(2-methylthioethyl acrylate) having a reduced viscosity of 1.7, at a temperature of 90° C., for a period of 16 hours. The resulting polymer product was coagulated in and washed with isopropyl ether, and subsequently dried at a temperature of 50° C. in an air-circulating oven. There were thus obtained 20.7 grams of copolymer comprised of approximately 75 percent by weight of 2-methylthioethyl acrylate and 25 percent by weight of (2-acryloxyethyl)carboxymethylmethylsulfonium chloride, i.e. approximately 84 mole percent of 2-methylthioethyl acrylate and 16 mole percent of (2-acryloxyethyl)carboxymethylmethylsulfonium chloride in polymerized form, on a theoretical monomer basis. The copolymer product was found to contain 3.9 percent by weight of chlorine.

When blended with a conventional fiber-forming acrylonitrile polymer as described above in Example III, the copolymer product of this example substantially improves the dye affinity of fibers produced therefrom. In similar manner, dye affinity is improved by blending the acrylonitrile polymer with a methyl acrylate/(2-acryloxyethyl)dimethylsulfonium methylsulfate copolymer in accordance with this invention.

*Example VIII*

A 300 milliliter Pyrex pressure bottle was charged with 17.2 grams of poly(2-methylthioethyl acrylate), have a reduced viscosity of 1.7, 50 grams of acetonitrile and 50 grams of acetone, capped and tumbled in a constant temperature rotary water bath maintained at a temperature of 50° C. until a homogeneous solution was obtained. The solution was divided into three equal portions, which were placed in three similar pressure bottles (A, B and C). To bottle A there were added 4.95 grams of dimethyl sulfate; to bottle B there were added 3.75 grams of dimethyl sulfate; and to bottle C there were added 2.5 grams of dimethyl sulfate. Each of the bottles were then capped and heated in a water bath maintained at a temperature of 50° C. for a period of 16 hours. The resulting polymer products formed in each of the bottles separated from solution, and were redissolved by the addition of 50 milliliters of water to each bottle. The polymer products were then coagulated in and washed with acetone, and subsequently dried at a temperature of 50° C. in an air-circulating oven. There were thus obtained from bottle A, 9.9 grams of poly(2-acryloxyethyldimethylsulfonium methylsulfate); from bottle B, 8.3 grams of a copolymer comprised of approximately 75 mole percent of polymerized (2-acryoxyethyl)dimethylsulfonium methylsulfate and 25 mole percent of polymerized 2-methylthioethyl acrylate, on a theoretical monomer basis; and from bottle C, 5.8 grams of a copolymer comprised of approximately 50 mole percent of polymerized (2-acryloxyethyl)dimethylsulfonium methylsulfate and 50 mole percent of polymerized 2-methylthioethyl acrylate, on a theoretical monomer basis. Each of these polymer products are useful in improving the dye affinity of fibers formed from conventional fiber-forming acrylonitrile with polymers when blended therewith in accordance with this invention.

What is claimed is:

1. The alpha-ethylenically unsaturated sulfine of the formula:

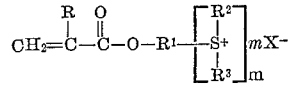

wherein R is a member selected from the group consisting of hydrogen and methyl, $R^1$ is a saturated aliphatic hydrocarbon radical of from 1 to 4 carbon atoms, $R^2$ is alkyl of from 1 to 4 carbon atoms, $R^3$ is a member selected from the group consisting of methyl and carboxymethyl, X is a member selected from the group consisting of methylsulfate, bromine, iodine and chlorine, such that X is chlorine when $R^3$ is carboxymethyl, and $m$ is an integer of from 1 to 2.

2. (2-acryloxyethyl)dimethylsulfonium methylsulfate of the formula:

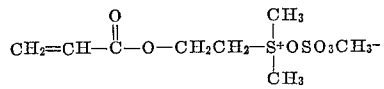

3. (2-methacryloxyethyl)dimethylsulfonium methylsulfate of the formula:

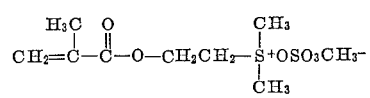

4. (2-acryloxyethyl)methylethylsulfonium methylsulfate of the formula:

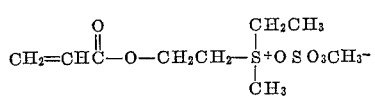

5. (2-methacryloxyethyl)carboxymethylmethylsulfonium chloride of the formula:

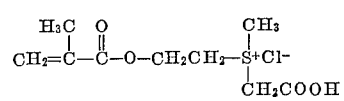

6. 3-methacryloxypropyl-1,2-bis(dimethylsulfonium) di(methylsulfate) of the formula:

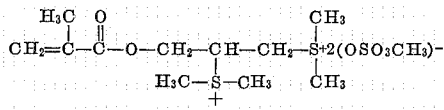

7. The solid homopolymer of an alpha-ethylenically unsaturated sulfine of the formula:

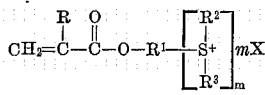

wherein R is a member selected from the group consisting of hydrogen and methyl, $R^1$ is a saturated aliphatic hydrocarbon radical of from 1 to 4 carbon atoms, $R^2$ is alkyl of from 1 to 4 carbon atoms; $R^3$ is a member selected from the group consisting of methyl and carboxymethyl, X is a member selected from the group consisting of methylsulfate, bromine, iodine and chlorine, such that X is chlorine when $R^3$ is carboxymethyl, and $m$ is an integer of from 1 to 2.

8. Solid poly[(2-acryloxyethyl)dimethylsulfonium methylsulfate].

9. Solid poly[(2-acryloxyethyl)carboxymethylmethylsulfonium chloride].

10. Solid poly[3-methacryloxypropyl-1,2-bis(dimethylsulfonium) di(methylsulfate)].

11. The solid interpolymer consisting essentially of (A) a polymerized alpha-ethylenically unsaturated sulfine of the formula:

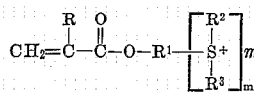

wherein R is a member selected from the group consisting of hydrogen and methyl, $R^1$ is a saturated aliphatic hydrocarbon radical or from 1 to 4 carbon atoms, $R^2$ is alkyl of from 1 to 4 carbon atoms, $R^3$ is a member selected from the group consisting of methyl and carboxymethyl, X is a member selected from the group consisting of methylsulfate, bromine, iodine and chlorine, such that X is chlorine when $R^3$ is carboxymethyl, and $m$ is an integer of from 1 to 2; and (B) a polymerized alpha-ethylenically unsaturated thioether of the formula:

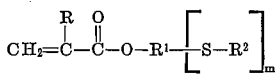

wherein R, $R^1$, $R^2$ and $m$ are as defined above; said interpolymer containing, in polymerized form and on a theoretical monomer basis, at least about 10 mole percent of said alpha-ethylenically unsaturated sulfine.

12. The solid interpolymer consisting essentially of (A) a polymerized alpha-ethylenically unsaturated sulfine of the formula:

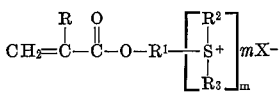

wherein R is a member selected from the group consisting of hydrogen and methyl, $R^1$ is a saturated aliphatic hydrocarbon radical or from 1 to 4 carbon atoms, $R^2$ is alkyl of from 1 to 4 carbon atoms, $R^3$ is a member selected from the group consisting of methyl and carboxymethyl, X is a member selected from the group consisting of methylsulfate, bromine, iodine and chlorine, such that X is chlorine when $R^3$ is carboxymethyl, and $m$ is an integer of from 1 to 2; and (B) a polymerized alpha-ethylenically unsaturated thioether of the formula:

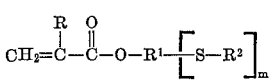

wherein R, $R^1$, $R^2$ and $m$ are as defined above; said interpolymer containing, in polymerized form and on a theoretical monomer basis, at least about 50 mole percent of said alpha-ethylenically unsaturated sulfine.

13. The solid copolymer of (2-acryloxyethyl)dimethylsulfonium methylsulfate with 2-methylthioethyl acrylate containing, in polymerized form and on a theoretical monomer basis, at least about 10 mole percent of said (2-acryloxyethyl)dimethylsulfonium methylsulfate.

14. The solid copolymer of (2-acryloxyethyl)carboxymethylmethylsulfonium chloride with 2-methylthioethyl acrylate containing, in polymerized form and on a theoretical monomer basis, at least about 10 mole percent of said (2-acryloxyethyl)carboxymethylmethylsulfonium chloride.

15. The solid copolymer of 3-methacryloxypropyl-1,2-bis(dimethylsulfonium) di(methylsulfate) with 2,3-bis(methylthio)propyl methacrylate containing, in polymerized form and on a theoretical monomer basis, at least about 10 mole percent of said 3-methacryloxypropyl-1,2-bis(dimethylsulfonium) di(methylsulfate).

16. The solid interpolymer consisting essentially of (A) a polymerized alpha-ethylenically unsaturated sulfine of the formula:

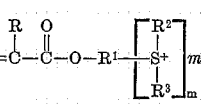

wherein R is a member selected from the group consisting of hydrogen and methyl, $R^1$ is a saturated aliphatic hydrocarbon radical or from 1 to 4 carbon atoms, $R^2$ is alkyl of from 1 to 4 carbon atoms, $R^3$ is a member selected from the group consisting of methyl and carboxymethyl, X is a member selected from the group consisting of methylsulfate, bromine, iodine and chlorine, such that X is chlorine when $R^3$ is carboxymethyl, and $m$ is an integer of from 1 to 2; and (B) a polymerized alpha-ethylenically unsaturated comonomer selected from the group consisting of (a) acrylonitrile, (b) a compound of the formula:

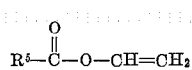

wherein $R^5$ is alkyl of from 1 to 7 carbon atoms, and (c) a compound of the formula:

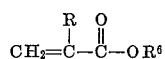

wherein R is as defined above and $R^6$ is a member selected from the group consisting of alkyl and cyanoalkyl of from 1 to 8 carbon atoms; said interpolymer containing, in polymerized form and on a theoretical monomer basis, at least about 1 mole percent of said alpha-ethylenically unsaturated sulfine.

17. The solid interpolymer consisting essentially of (A) a polymerized alpha-ethylenically unsaturated sulfine of the formula:

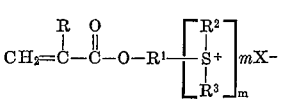

wherein R is a member selected from the group consisting of hydrogen and methyl, $R^1$ is a saturated aliphatic hydrocarbon radical of from 1 to 4 carbon atoms, $R^2$ is alkyl of from 1 to 4 carbon atoms, $R^3$ is a member selected from the group consisting of methyl and carboxymethyl, X is a member selected from the group consisting of methylsulfate, bromine, iodine and chlorine, such that X is chlorine when $R^3$ is carboxymethyl, and $m$ is an integer of from 1 to 2; and (B) a polymerized alpha-ethylenically unsaturated comonomer selected from the group consisting of (a) acrylonitrile, (b) a compound of the formula:

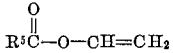

wherein $R^5$ is alkyl of from 1 to 7 carbon atoms, and (c) a compound of the formula:

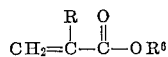

wherein R is as defined above and $R^6$ is a member selected from the group consisting of alkyl and cyanoalkyl of from 1 to 8 carbon atoms; said interpolymer containing in polymerized form, on a theoretical monomer basis, from about 5 to about 95 mole percent of said alpha-ethylenically unsaturated sulfine.

18. The solid copolymer of (2-methacryloxyethyl)dimethylsulfonium methylsulfate with methyl acrylate containing, in polymerized form and on a theoretical monomer basis, from about 5 to about 95 mole percent of said (2-methacryloxyethyl)dimethylsulfonium methylsulfate.

19. The solid copolymer of (2-methacryloxyethyl)carboxymethylmethylsulfonium chloride with methyl acrylate containing, in polymerized form and on a theoretical monomer basis, from about 5 to about 95 mole percent of said (2-methacryloxyethyl)carboxymethylmethylsulfonium chloride.

20. The solid copolymer of 3-methacryloxypropyl-1,2-bis(dimethylsulfonium) di(methylsulfate) with methyl acrylate containing, in polymerized form and on a theoretical monomer basis, from about 5 to about 95 mole percent of said 3-methacryloxypropyl-1,2-bis(dimethylsulfonium) di(methylsulfate).

21. The solid interpolymer consisting essentially of (A) a polymerized alpha-ethylenically unsaturated sulfine of the formula:

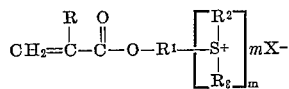

wherein R is a member selected from the group consisting of hydrogen and methyl, $R^1$ is a saturated aliphatic hydrocarbon radical of from 1 to 4 carbon atoms, $R^2$ is alkyl of from 1 to 4 carbon atoms, $R^3$ is a member selected from the group consisting of methyl and carboxymethyl, X is a member selected from the group consisting of methylsulfate, bromine, iodine and chlorine, such that X is chlorine when $R^3$ is carboxymethyl, and $m$ is an integer of from 1 to 2; (B) a polymerized alpha-ethylenically unsaturated thioether of the formula:

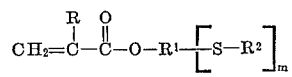

wherein R, $R^1$, $R^2$ and $m$ are as defined above, and (C) a polymerized alpha-ethylenically unsaturated comonomer selected from the group consisting of (a) acrylonitrile, (b) a compound of the formula:

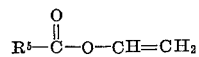

wherein $R^5$ is alkyl of from 1 to 7 carbon atoms, and (c) a compound of the formula:

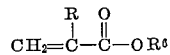

wherein R is as defined above and $R^6$ is a member selected from the group consisting of alkyl and cyanoalkyl of from 1 to 8 carbon atoms; said interpolymer containing, in polymerized form and on a theoretical monomer basis, at least about 50 mole percent of said alpha-ethylenically unsaturated sulfine when taken together with the amount of polymerized alpha-ethylenically unsaturated thioether present, and from about 5 to about 95 mole percent of said alpha-ethylenically unsaturated sulfine based upon the total interpolymer.

No references cited.

JOSEPH L. SCHOFER, *Primary Examiner.*

D. K. DENENBERG, *Assistant Examiner.*